United States Patent

[11] 3,559,772

[72] Inventor Walter J. Grombka
 Tiffin, Ohio
[21] Appl. No. 762,096
[22] Filed Sept. 24, 1968
[45] Patented Feb. 2, 1971
[73] Assignee The National Machinery Company
 Tiffin, Ohio
 a corporation of Ohio

[54] SPRING APPLIED, FLUID PRESSURE RELEASED BRAKE
 26 Claims, 6 Drawing Figs.

[52] U.S. Cl. .................................................. 188/170,
 188/72.3, 188/196
[51] Int. Cl. ........................................... F16d 65/24,
 F16d 55/16
[50] Field of Search ........................................ 188/72,
 170, 196V, 264A

[56] References Cited
 UNITED STATES PATENTS
 2,914,142 11/1959 Klaue .......................... 188/72
 3,082,647 3/1963 Banker .......................... 188/170X FOREIGN PATENTS
 934,142 8/1963 Great Britain ................ 188/170

Primary Examiner—Duane A. Reger
Attorney—McNenny, Farrington, Pearne and Gordon

ABSTRACT: A disc brake for heavy machinery such as metal working presses and the like which includes a rotatable disc mounted on a projecting shaft for rotation with the shaft and for axial movement relative to the shaft. A stationary brake ring is mounted on the frame of the machine and has a face adjacent to one side of the disc. The other side of the disc faces an axially movable brake ring which is locked to the stationary brake ring to prevent relative rotation therebetween. A cover plate is fixed to the stationary brake ring. Springs are provided between the cover plate and the axially movable brake ring to bias the brake against the disc to thereby apply braking pressure to the shaft and fluid motor means are provided to overcome the bias of the springs to thereby release the brake. Shims are provided between the cover plate and the stationary brake ring so that, as the braking surfaces wear, the initial spring tension may be reestablished by removing one or more shims.

PATENTED FEB 2 1971

INVENTOR
WALTER J. GROMBKI
BY
McNENNY, FARRINGTON, PEARNE & GORDON

ATTORNEYS

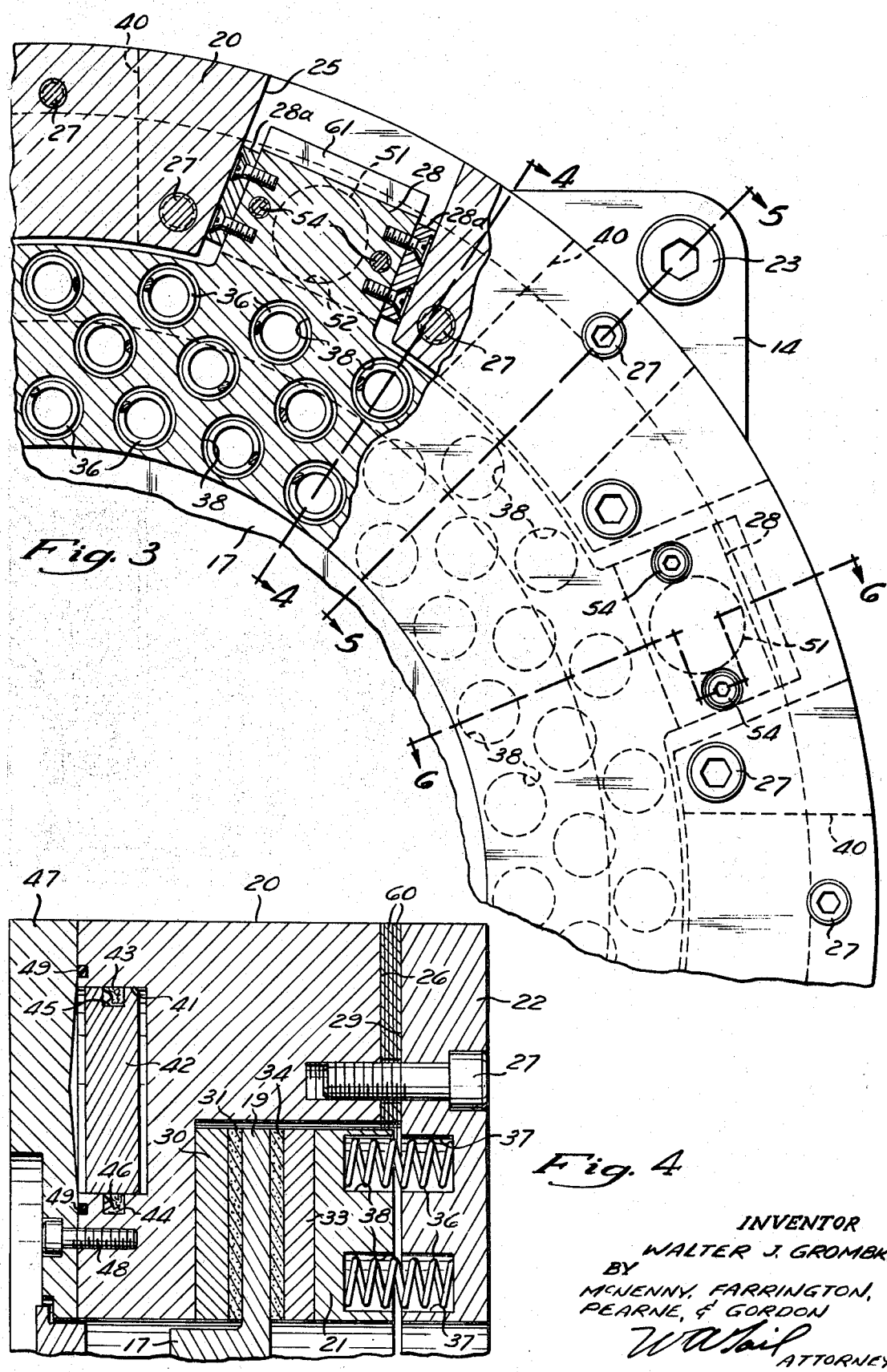

SPRING APPLIED, FLUID PRESSURE RELEASED BRAKE

BACKGROUND OF THE INVENTION

This invention relates to disc brakes for heavy machinery such as metal working presses and the like, wherein the machine operates through one complete cycle for forging one piece and then comes to rest upon the disengagement of a clutch and the application of a brake. While the machine is at rest, the operator removes the forged article and inserts another blank into the dies after which the machine is recycled. It is highly important in such single-cycle forging machines that the machine may be brought to rest with the dies in a predetermined open position to permit insertion of the blank between the dies. Since such brakes must be designed to withstand high inertia loads when applied, it is necessary to provide brakes which transfer braking torque directly to the machine housing without applying substantial torque to brake applying linkages to minimize shear forces on such linkages.

Such prior art brakes usually comprise disc-type brakes having a rotatable member mounted for rotation on the crankshaft of the forging machine. The rotatable member has an annular brake section which is gripped between a stationary brake ring mounted on the machine frame and a movable brake ring which is axially movable relative to the stationary brake ring. The movable brake ring is moved into braking contact with the annular brake section by fluid-operated piston means and is released therefrom by springs, e.g. U.S. Pat. No. 2,778,451 to R.G. Friedman, or is moved into contact with the annular brake section by springs and is released from the brake section by fluid-operated piston means, e.g. U.S. Pat. No. 2,775,319 to R.G. Friedman. According to the disclosure of the latter patent, the brake application force exerted by the springs may be adjusted to compensate for brake lining wear by adjusting exposed locknuts holding the springs. Such an adjusting operation may be, however, improperly performed by the machine operator, since it is impossible for him to determine or gauge the proper, as installed, spring force which is applied to the annular brake section. The operator may adjust the spring tension so that undue wear is imposed on the brake linings, causing premature failure of such linings. Furthermore, he may tighten the springs to such an extent that the fluid-operated piston may not function to fully disengage the movable brake ring from the annular brake section, thus causing an undesirable drag on the brake linings during machine cycling.

Since considerable heat is generated between the rotating brake section and the brake applying member, it is highly desirable to cool the annular brake section. Prior art brake assemblies include channeling in the brake applying members through which a coolant is circulated. Such channeling involves cutting and boring operations which increase the cost of the brake and provide passageways which may become scaled and corroded if demineralized water or special coolants are not employed.

Many existing brake assemblies have brake applying and brake releasing devices which act on a movable brake ring. Since considerable force must be applied by the brake releasing device to overcome the brake applying pressure exerted by the brake applying member and since such brake applying and brake release members are usually radially spaced a considerable distance apart, the movable brake ring in such prior art devices becomes deflected and even permanently warped by the forces applied thereto. Such deflection results in uneven application of the brake and undue wear of the brake lining.

A brake produced in accordance with the teachings of this invention overcomes many of the problems set forth above and includes a rotatable member mounted on the crankshaft of a cyclically operated forming machine for rotation with the shaft but axially movable relative to the shaft. A stationary brake ring is mounted on the machine frame between the frame and the brake member and has a face adjacent to one side of an annular section of the rotatable brake member. An axially movable brake ring is provided adjacent to the other side of the annular brake section and locking means are provided between the stationary brake ring and the axially movable brake ring to prevent relative rotation therebetween. A cover plate is fixed to the stationary brake ring and, with the stationary brake ring, defines an annular chamber within which the annular brake section and the axially movable brake ring are located. Springs are provided between the cover plate and the axially movable brake ring to bias the brake ring against the annular brake section to apply the brake to the shaft and fluid-operated piston means are provided to overcome the bias of the springs to release the brakes. Since the springs are provided between the cover plate and the axially movable brake ring, the operator cannot tamper with the springs to change their settings. However, the biasing force of the springs may be reestablished if reduced by wear between the brake applying members and the annular brake section. According to this invention such an adjustment is performed by removing one or more shims which are provided between the cover plate and the stationary brake ring. By a simple gauging technique, the machine operator may determine how many shims to remove in order to establish initial spring tension. The removal of one or more shims, moreover, establishes uniform spring pressure about the circumference of the movable brake ring to prevent the uneven application of spring pressure to the movable brake ring.

According to another aspect of this invention, the fluid-operated piston means for releasing the brake includes an annular pressure chamber in the fixed brake ring and a plurality of brake applying pins extending from an annular piston mounted in the annular pressure chamber and into pressure applying contact with the movable brake ring. Shims are provided between the pins and the movable brake ring so that the effective length of the pins may be reduced as shims are removed between the stationary brake ring and the cover plate.

According to a further aspect of this invention, the locking means between the stationary brake ring and the movable brake rings includes a plurality of radially extending slots in the stationary brake ring and a corresponding plurality of radial projections on the movable brake ring which cooperate with the slots. Replaceable side check plates may be provided on the radial projections so that they may be replaced if worn.

According to a still further aspect of this invention, the annular brake section is cooled by air passageways which extend radially through the stationary brake ring and into the braking chamber.

OBJECTS OF THE INVENTION

In view of the foregoing, it should be appreciated that it is an important object of this invention to provide a disc brake for a cyclically operated forming machine which has tamper-proof springs which may be adjusted to compensate for brake wear by a simple operation.

It is a further object of this invention to provide a disc brake for a cyclically operated forming machine wherein braking torque is transferred from the brake applying members directly to the machine housing and wherein torque pressure receiving members are replaceable if worn.

It is a still further object of this invention to provide a disc brake for a cyclically operated forming machine wherein air cooling passageways are provided into a braking chamber.

It is a still further aspect of this invention to provide a disc brake for a cyclically operated forming machine wherein the brake applying force is exerted in alignment with and substantially uniformly along the braking surfaces to reduce bending moments on the movable brake member and to provide a uniform distribution of the braking force.

According to a still further aspect of this invention, the distance between the center of spring applied force and the center of brake releasing force is minimized to correspondingly minimize deflection of the movable brake ring.

These and other objects, features, and advantages of the invention will become more apparent and more readily understood from the following detailed description of the preferred embodiment and from the accompanying drawings.

BRIEF DESCRIPTION OF THE DRAWINGS

FIG. 3 is an enlarged fragmentary elevational view of the brake according to this invention with a portion of the cover plate broken away and showing the stationary and movable brake rings in section to show a certain detail of construction;

FIG. 4 is a cross-sectional view, the plane of the section being indicated by the line 4-4 in FIG. 3;

DETAILED DESCRIPTION OF THE PREFERRED EMBODIMENT

Figure 1:
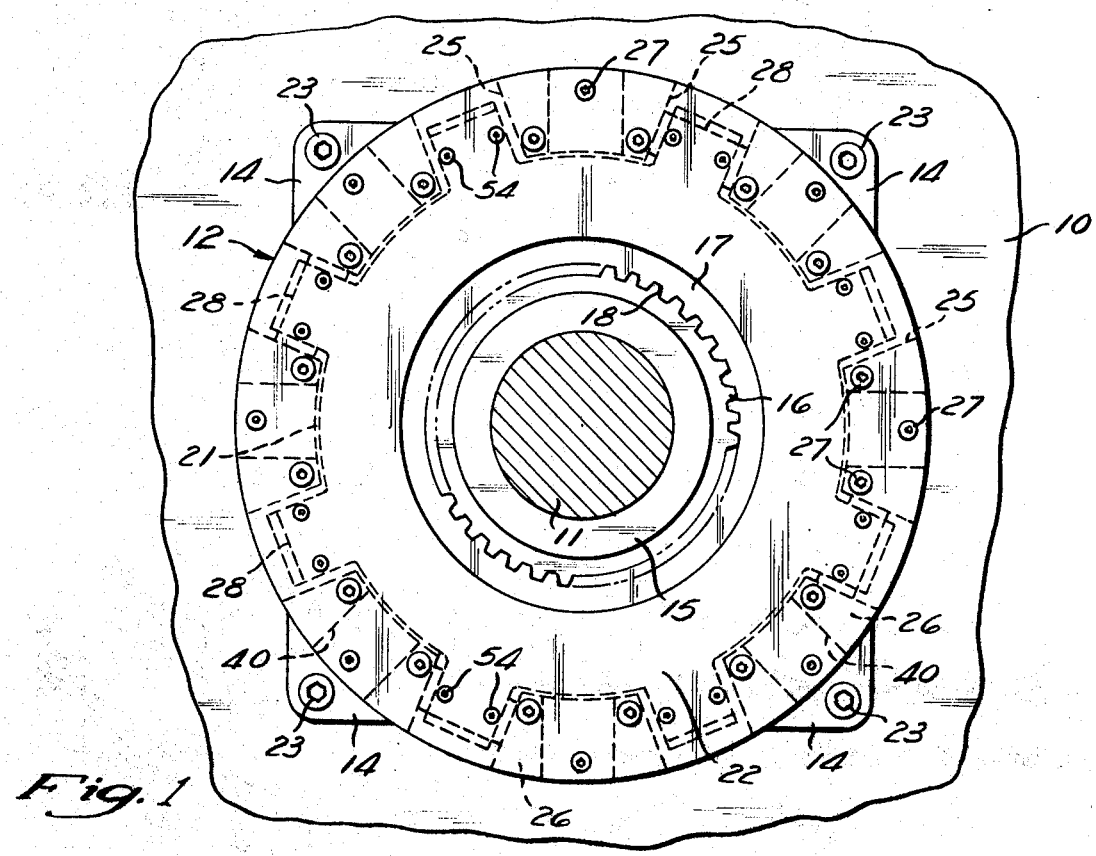
FIG. 1 is an elevation showing a brake according to this invention applied to a forging press.

Referring to the drawings, a bed frame 10 of a forging press having a crankshaft 11 projecting therefrom is illustrated. It is characteristic of forging presses that they operate in a cyclic fashion, that is, each revolution of the crankshaft 11 effects a forging operation, and that the machine is brought to rest after each forging operation. The accuracy and the efficiency of the braking operation is frequently a measure of the effectiveness of the forging machine. In order to provide such a braking function, a disc brake assembly 12 is provided on the forging machine. To support the brake assembly 12, four spaced feet or lugs 14 are carried by the bed frame 10 and the braking torque is transmitted to the bed frame 10 by the feet or lugs 14.

The crankshaft 11 has keyed to it a hub 15 which is provided with an annular flange having a spline 16 at its periphery. A rotatable brake member 17 is provided with an internal spline 18 at its inner periphery which meshes and engages the spline 16 so that the rotatable member 17 is rotated with the crankshaft 11 but is free to slide axially or "float" relative to the shaft 11.

The rotatable member 17 is provided with an annular brake section 19 which, when subjected to brake applying pressures at its opposite faces, will effectively restrain movement of the shaft 11. The brake applying mechanism is composed of an assembly which includes a stationary brake ring 20, a movable brake ring 21, and a cover plate 22.

Figure 2:
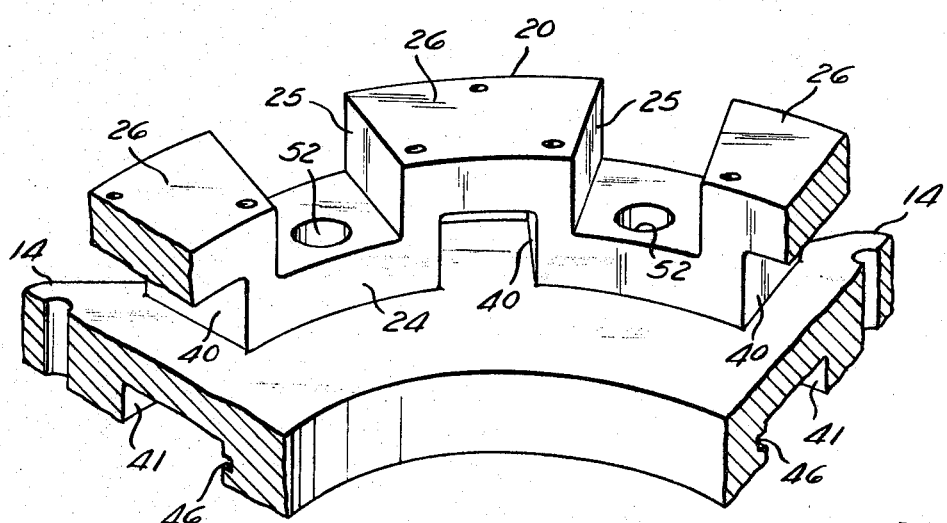
FIG. 2 is a fragmentary perspective view of a quadrant of the stationary brake ring.

The stationary brake ring 20 is fixed to the machine frame 10 by four bolts 23 which extend through the feet or lugs 14 and into the frame 10. As may be seen most clearly in FIG. 2, the stationary brake ring 20 has an axially extending annular projection or rib 24 which is provided with a plurality of radially extending slots 25. The projection 24 has an upper surface 26. The cover plate 22 is secured to the stationary brake ring 20 by bolts 27 so that the cover plate 22 is fixed relative to the stationary brake ring 20 and, therefore, the machine frame 10.

The movable brake ring 21 is provided with a plurality of radial projections 28 which cooperate with the radial slots 25 so that the movable brake ring 21 is locked or keyed to the stationary brake ring 20, but is movable within an annular chamber defined by an inner surface 29 of the cover plate 22 and by the stationary brake ring 20. Removable check plates 28a are bolted to the sides of some or all of the projections 28 and are replaceable if worn. In the illustrated embodiment, a total of eight projections 28 are symmetrically provided around the movable brake ring 21, but removable check plates 28a are bolted to the sides of alternate projections; therefore, only four sets of check plates are provided.

An annular brake applying pad 30 having a friction material 31 bonded thereto is bolted to the stationary brake ring 20 by bolts 32. A corresponding annular brake applying pad 33 having a friction material 34 bonded thereto is fixed to the movable brake ring 21 by means of bolts 35. The annular brake section 19 of the rotatable member 17 projects between the brake applying pads 30 and 33 and is gripped by the friction material 31 and 34 when the movable brake ring 21 is urged to the left as viewed in FIGS. 4, 5, and 6. The movable brake ring 21 is so moved to thereby apply braking forces to the shaft 11 by a plurality of springs 36 which are located between the cover plate 22 and the axially movable brake ring 21 and which are retained therebetween by a plurality of recesses 37 provided in the cover plate 22 and a corresponding and cooperating plurality of recesses 38 which are provided in the movable brake ring 21. Since the rotatable member 17 is free to move axially or "float" relative to the hub 15, it slides axially under the force exerted by the movable brake ring 21 and engages the friction material 31 provided on the stationary brake ring 20. It should be noted that when the friction members 31 and 34 securely grip the annular brake section 19, the braking torque is transmitted to the machine fame 10 through the stationary brake ring 20 directly and through the radial projections 28 to the stationary brake ring 20.

The springs 36 are aligned with the braking surface so that their forces intersect and are uniformly distributed along the annular brake section 19 of the rotatable member 17. This minimizes bending moments on the movable brake ring 21, and ensures an even distribution of the braking force.

Means are provided to air cool the annular brake section 19 upon application of the friction members 31 and 34. To this end, there are provided a plurality of radial passageways 40 through the annular projection 24 and into the annular brake chamber formed by the stationary brake ring 20 and the movable brake ring 21.

Figure 5:
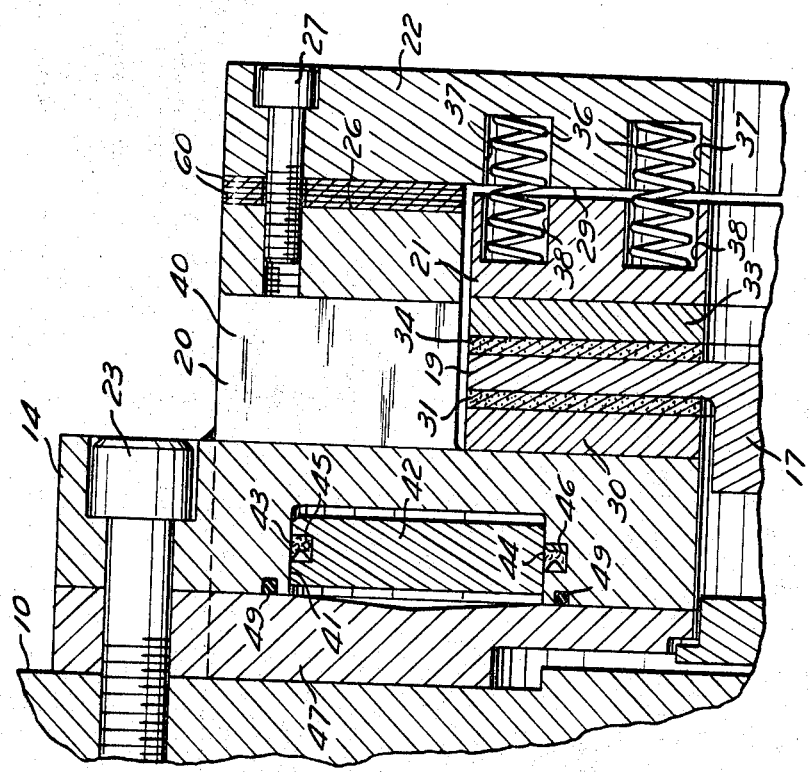
FIG. 5 is a cross-sectional view, the plane of the section being indicated by the line 5-5 in FIG. 3.
Figure 6:
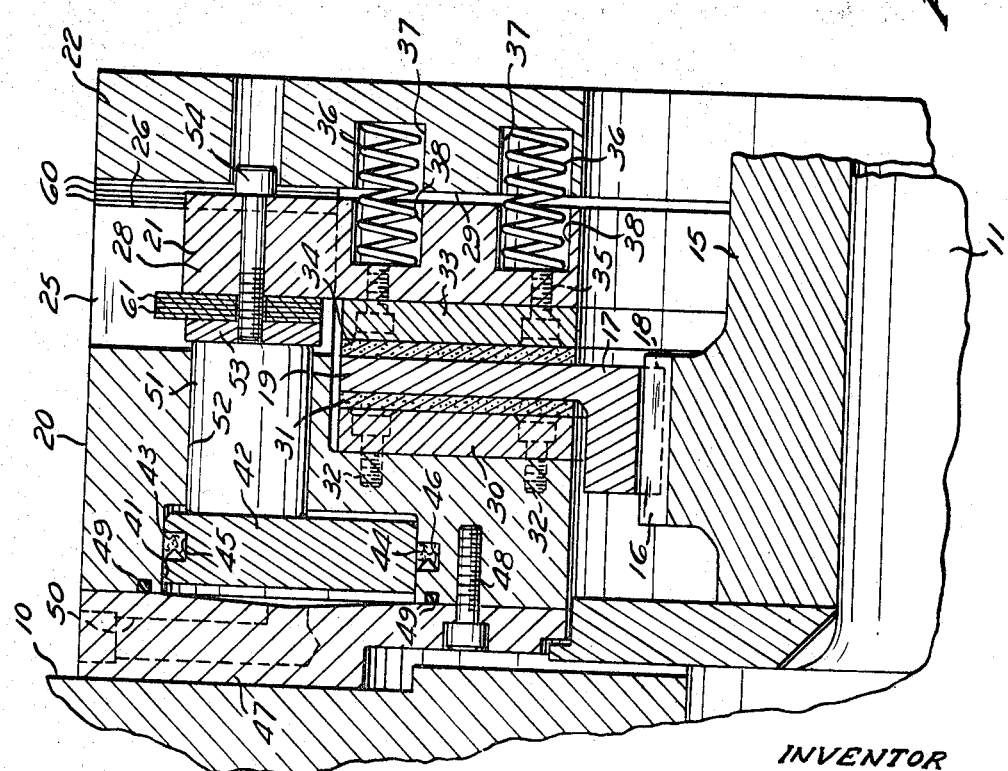
FIG. 6 is a cross-sectional view, the plane of the section being indicated by the line 6-6 of FIG. 3.

In order to release the brake, a fluid motor means, which in the illustrated embodiment is an air cylinder means, is provided to cancel or overcome the thrust of the springs 36 and the force applied by the movable brake ring 21 so that the shaft 11 is free to rotate. To this end, there is provided an annular piston chamber or groove 41 in the stationary brake ring 20 within which an annular piston 42 is slidably mounted for axial movement relative to the stationary brake ring 20. Packing rings 43 and 44 are respectively provided in a groove 45 cut in the piston 42 and in a groove 46 provided in a sidewall of the annular chamber 41. One end of the annular chamber 41 is closed by an annular ring 47 which is fixed to the stationary brake ring 20 by bolts 48 and which is fixed to the stationary brake ring 20 and the machine frame 10 by the bolts 23 (FIG. 5). Seals 49 are provided between the annular ring and the stationary brake ring 20. A fluid passageway 50 through the stationary brake ring 20 connects the chamber 41 to a source of fluid pressure (not shown).

When the fluid pressure is admitted through the passageway 50 and behind the annular piston 42, a plurality of brake releasing pins 51 are driven axially away from the chamber 41. The brake releasing pins 51 are slidably mounted in bores 52 which extend from the chamber 41 to each radially extending slot 25 in the annular projection 24. When fluid pressure is applied in this manner, the brake releasing pins 51 bear against pressure pads 53 which are bolted to each radial projection 28 by bolts 54 to thereby move the movable brake ring 21 against the bias of the springs 36 and, therefore, disengage the friction material 34 from the annular brake section 19.

When fluid pressure behind the piston 42 is released, the springs 36 force the movable brake ring 21 back into engagement with the annular brake section 19, thus setting the brake. The introduction of the fluid from behind the piston 42 is usually controlled by foot pedal means (not shown) actuated by the operator.

As may be seen in the drawings, the zones of application of the brake releasing pins to the ring 21 are closely spaced relative to the zones of application of the springs 36 to the ring 21 to minimize deflection of the ring 21.

The brake shown and described herein is illustrated in its original condition with no wear between the annular brake section 19 and the friction members 31 and 34. As the friction members are repeatedly applied to the annular brake section, however, they are worn, with a consequent reduction in their thickness. Thus, the brake application stroke of the movable brake ring 21 is increased with a corresponding decrease in brake application force exerted by the springs 36. Means are provided to reestablish the initial brake application force by reestablishing the original spacing between the cover plate and the movable brake ring 21 when the brake ring is applied to the annular brake section 19. Such an adjustment is accomplished by providing a plurality of shims 60 between the cover plate 22 and the faces 26 of the stationary brake ring 20. Removal of one or more of the shims 60 will reestablish the original spacing between the cover plate 22 and the movable brake ring 21, thus returning the brake applying spring force to its original value. This operation may be performed, for example, by providing a gauge having a thickness corresponding to the initial spacing between the cover plate 22 and the movable brake ring 21 when the movable brake ring 21 is applied to the annular brake section 19. Periodically, the gauge may be inserted between the radial projections 28 and the cover plate 22 through the radial slot 25 and, if clearance exists, one or more shims may be removed to reestablish the predetermined spacing.

It should be noted that as the shims 60 are removed, the pressure pad 53 on each radial projection 28 is drawn closer to the bottom face of each radial slot 25. To prevent the pressure pad from bottoming on this face, thus preventing brake applying contact between the friction members 31 and 34 and the annular brake section 19, means are provided to return the pressure pad to its illustrated position spaced from the bottom face of the radial slot 25. To this end there are provided a plurality of shims 61 between each pressure pad 53 and its radial projection 28. The shims 61 are removed on a one-for-one basis with the shims by removing the bolts 54.

Although one preferred embodiment of this invention is illustrated, it is to be understood that various modifications and rearrangements of parts may be resorted to without departing from the scope of the invention disclosed.

I claim:

1. A brake for a shaft mounted on a frame and projecting therefrom comprising a rotatable member mounted on said projecting shaft for rotation therewith having an annular brake section, a stationary brake ring mounted on said frame between said frame and said brake member having a face adjacent to one side of said annular brake section, an axially movable brake ring adjacent to the other side of said annular brake section remote from said frame, locking means between said stationary brake ring and said axially movable brake ring to prevent relative rotation therebetween, a cover plate fixed to said stationary brake ring and, with said stationary brake ring, defining an annular chamber within which said annular brake section and said axially movable brake ring are located, spring means having one end thereof abutting a portion of said cover plate which is nonadjustable relative to the remaining portion of said cover plate, the other end of said spring means extending within said annular chamber and coacting between said cover plate and said axially movable brake ring to bias said brake ring against the shaft annular brake section, means to increase the biasing force of said spring means to compensate for any wear between brake rings and said annular brake section, said means comprising means to adjust the cover plate, including said nonadjustable portion of said cover plate and said remaining portion of said cover plate, to any one of a number of fixed positions relative to said stationary brake ring, whereby the distance between said nonadjustable portion of said cover plate and said stationary brake ring may be varied to thereby vary the biasing force of said spring means, and fluid motor means adapted to overcome the bias of said spring means to thereby release the brake.

2. A brake according to claim 1 wherein said stationary brake ring is provided with radial slots and said movable brake ring is provided with radial projections which cooperate with said slots to comprise said locking means.

3. A brake according to claim 2 wherein at least some of said radial projections are provided with replaceable side check plates which are engageable with said radial slots.

4. A brake according to claim 1 wherein the forces of said springs intersect portions of said annular brake section to thereby eliminate brake applying bending forces applied to said movable brake ring.

5. A brake according to claim 1 wherein said means to increase the biasing force of said spring means comprises shim means between said cover plate and said stationary brake ring to space said cover plate and said movable brake ring a predetermined distance apart when said movable brake ring is biased against said annular brake section whereby removal of said shim means decreases said predetermined distance between said cover plate and the movable brake ring and the spacing between the cover plate and the stationary brake ring to increase the biasing force of said spring means.

6. A brake according to claim 1 wherein said fluid motor means comprises cylinder means within said stationary brake ring, piston means slidable within said cylinder means, and brake releasing pin means extending between said piston means and said movable brake ring, whereby application of fluid pressure behind said piston moves said movable brake ring away from said annular brake section to thereby release the brake.

7. A brake according to claim 6 wherein said cylinder means comprises an annular groove in said stationary brake ring and said piston means comprises a flat ring axially slidable within said groove.

8. A brake according to claim 1 wherein cooling means are provided for said brake.

9. A brake according to claim 8 wherein said cooling means comprises a plurality of radially extending passageways through said stationary brake ring and opening into said annular chamber.

10. A brake for a shaft mounted on a frame and projecting therefrom comprising a rotatable brake member mounted on said projecting shaft for rotation therewith having an annular brake section, a stationary brake ring mounted on said frame between said frame and brake member having a face adjacent to one side of said annular section, an axially movable brake ring adjacent to the other side of said annular section remote from said frame, locking means between said stationary ring and said axially movable brake ring to prevent relative rotation therebetween, a cover plate fixed to said stationary brake ring and, with said stationary brake ring, defining an annular chamber within which said annular brake section and said axially movable brake ring are located, spring means between said cover plate and said axially movable brake ring to bias said brake ring against said annular brake section and to thereby apply the brake to the shaft, means to increase the biasing force of said spring means to its original force to compensate for any wear between said movable brake ring and said annular brake section, said means to increase said force comprising shim means between said cover plate and said stationary brake ring, whereby removal of said shim means decreases the spacing between said cover plate and said stationary brake ring and thereby increases the biasing force of said spring means, fluid motor means comprising cylinder means within said stationary brake ring, piston means slidable within said cylinder means, brake releasing pin means extending between said piston means and said movable brake ring whereby application of fluid pressure behind said piston means moves said movable brake ring away from said annular brake section, and shim means between said brake releasing pin means and said movable brake ring.

11. A brake according to claim 10 wherein said stationary brake ring is provided with radial slots and said movable brake ring is provided with radial projections which cooperate with said slots to comprise said locking means.

12. A brake according to claim 11 wherein at least some of said radial projections are provided with replaceable side check plates which are engageable with said radial slots.

13. A brake according to claim 10 wherein said rotatable brake member is axially movable with respect to said projecting shaft.

14. A brake according to claim 10 wherein said cylinder means comprises an annular groove in said stationary brake ring and said piston means comprises a flat ring axially slidable within said groove.

15. A brake according to claim 10 wherein cooling means are provided for said brake.

16. A brake according to claim 15 wherein said cooling means comprises a plurality of radially extending passageways through said stationary brake ring and opening into said annular chamber.

17. A brake for a shaft mounted on a frame and projecting therefrom comprising a rotatable brake member mounted on said projecting shaft for rotation therewith and for axial movement with respect to said shaft, said brake member having an annular brake section, a stationary brake ring mounted on said frame between said frame and said brake member having a face adjacent to one side of said annular section, an axially movable brake ring adjacent to the other side of said annular section remote from said frame, locking means between said stationary brake ring and said axially movable brake ring to prevent relative rotation therebetween, a cover plate fixed to said stationary brake ring and, with said stationary brake ring defining an annular chamber within which said annular brake section and said axially movable brake ring are located, spring means between said cover plate and said axially movable brake ring to bias said axially movable brake ring against said annular brake section and to thereby apply the brake to the shaft, said annular chamber having an axial dimension which is sufficient to establish clearance between said cover plate and said movable brake ring when said annular brake section is engaged by said movable brake ring, said clearance defining the brake release and brake application stroke of said axially movable brake ring, said stroke being increased by wear between said stationary brake ring and said annular brake section and between said annular brake section and said axially movable brake ring with a corresponding decrease in the biasing force exerted by said spring means, means to reestablish said biasing force and to reduce said stroke to its initial extent comprising removable shim means between said cover plate and said stationary brake ring.

18. A brake according to claim 17 wherein fluid motor means is provided to overcome the bias of said spring means to thereby release the brake.

19. A brake according to claim 18 wherein said fluid motor means comprises cylinder means within said stationary brake ring, piston means slidable within said cylinder means, and brake releasing pin means extending between said piston means and said movable brake ring, whereby application of fluid pressure behind said piston moves said movable brake ring away from said annular brake section to thereby release said brake.

20. A brake according to claim 19 wherein said cylinder comprises an annular groove in said stationary brake ring and said piston means comprises a flat ring axially slidable within said groove.

21. A brake according to claim 17 wherein said stationary brake ring is provided with radial slots and said movable brake ring is provided with radial projections which cooperate with said slots to comprise said locking means.

22. A brake according to claim 21 wherein at least some of said radial projections are provided with replaceable side check plates which are engageable with said radial slots.

23. A brake according to claim 17 wherein cooling means are provided for said brake.

24. A brake according to claim 23 wherein said cooling means comprises a plurality of radially extending passageways through said stationary brake ring and opening into said annular chamber.

25. A brake for a shaft mounted on a frame and projecting therefrom comprising a rotatable member mounted on said projecting shaft for rotation therewith having an annular brake section, a stationary brake ring mounted on said frame between said frame and said brake member having a face adjacent to one side of said annular brake section, an axially movable brake ring adjacent to the other side of said annular brake section remote from said frame, locking means between said stationary brake ring and said axially movable brake ring to prevent relative rotation therebetween, a cover plate fixed to said stationary brake ring and, with said stationary brake ring, defining an annular chamber within which said annular brake section and said axially movable brake ring are located, spring means between said cover plate and said axially movable brake ring to bias said brake ring against the annular brake section, means to increase the biasing force of said spring means to compensate for any wear between said brake rings and said annular brake section, said means to increase the biasing force comprising shim means between said cover plate and said stationary brake ring to space said cover plate and said movable brake ring a predetermined distance apart when said movable brake ring is biased against said annular brake section whereby removal of said shim means decreases said predetermined distance between said cover plate and the movable brake ring and the spacing between the cover plate and the stationary brake ring to increase the biasing force of said spring means and fluid motor means adapted to overcome the bias of said spring means to thereby release the brake.

26. A brake for a shaft mounted on a frame and projecting therefrom comprising a rotatable member mounting on said projecting shaft for rotation therewith having an annular brake section, a stationary brake ring mounted on said frame between said frame and said brake member having a face adjacent to one side of said annular brake section, an axially movable brake ring adjacent to the other side of said annular brake section remote from said frame, locking means between said stationary brake ring and said axially movable brake ring to prevent relative rotation therebetween, a cover plate fixed to said stationary brake ring and, with said stationary brake ring defining an annular chamber within which said annular brake section and said axially movable brake ring are located, spring means having one end thereof abutting a portion of the cover plate which is nonadjustable relative to the remaining portion of the cover plate, the other end of said spring means extending within said annular chamber and coacting between said cover plate and said axially movable brake ring to bias said brake ring against the annular brake section, said means to increase the biasing force comprising shim means between said cover plate and said stationary brake ring to space said cover plate and said movable brake ring a predetermined distance apart when said movable brake ring is biased against said annular brake section, whereby removal of said shim means decreases said predetermined distance between said cover plate and the movable brake ring and the spacing between the cover plate and the stationary brake ring to increase the biasing force of said spring means, and fluid motor means adapted to overcome the bias of said spring means to thereby release the brake.